United States Patent
Wang et al.

(10) Patent No.: US 7,110,352 B2
(45) Date of Patent: Sep. 19, 2006

(54) DIRECT-SEQUENCE CDMA METHOD AND DEVICE

(75) Inventors: Haifeng Wang, Oulu (FI); Jing Xu, Jiangsu (CN); Ming Chen, Jiangsu (CN); Shixing Cheng, Jiangsu (CN)

(73) Assignee: Nokia Corporation, Espoo (FI)

( * ) Notice: Subject to any disclaimer, the term of this patent is extended or adjusted under 35 U.S.C. 154(b) by 93 days.

(21) Appl. No.: 10/731,688

(22) Filed: Dec. 9, 2003

(65) Prior Publication Data

US 2005/0122947 A1  Jun. 9, 2005

(51) Int. Cl.
*H04J 11/00* (2006.01)

(52) U.S. Cl. ............... 370/208; 370/320; 370/335; 375/229; 375/144

(58) Field of Classification Search ........... 370/208, 370/210, 320, 324, 326, 335, 342, 441, 491; 375/229, 231, 146, 144, 296
See application file for complete search history.

(56) References Cited

U.S. PATENT DOCUMENTS 6,188,717 B1 * 2/2001 Kaiser et al. ............... 375/148
6,842,487 B1 * 1/2005 Larsson ..................... 375/260

OTHER PUBLICATIONS

IEEE Communications Magazine 0163-6804/97; S. Hara et al.; "Overview of Multicarrier CDMA"; pp. 126-133; Dec. 1997.
IEEE Transactions on Communications, vol. 50, No. 6, 0090-6778/02; N. Benvenuto et al.; "On the Comparison Between OFDM and Single Carrier Modulation with a DFE Using a Frequency-Domain Feedforward Filter"; pp. 947-955; Jun. 2002.
D. Falconer et al.; "White Paper: Frequency Domain Equalization for Single-Carrier Broadband Wireless Systems"; pp. 1-24; Feb. 15, 2002.
IEEE 0-7803-7484-3/02; F. Vook et al.; "Cyclic-Prefix CDMA with Antenna Diversity"; pp. 1002-1006; 2002.
IEEE 0-7803-7377-4/02; K. Baum et al.; "Cyclic-Prefix CDMA: An Improved Transmission Method for Broadband DS-CDMA Cellular Systems"; 2002.
IEICE Trans. Commun., vol. E84-B, No. 3; S. Abeta et al.; "Performance of Coherent Multi-Carrier/DS-CDMA and MC-CDMA for Broadband Packet Wireless Access"; pp. 406-414; Mar. 3, 2001.

* cited by examiner

*Primary Examiner*—Chi Pham
*Assistant Examiner*—Alexander O. Boakye
(74) *Attorney, Agent, or Firm*—Ware, Fressola, Vam Der Sluys & Adolphson LLP (57) ABSTRACT

In code division multiple access communications wherein a plurality of data streams carrying a plurality of transmit symbols are spread by a plurality of assigned spread code, the data streams are divided into a plurality of data blocks and a plurality of prefixes in symbol-level are added to the data blocks prior to the data streams being spread and combined for transmission. At the receive side, the prefixes are removed from the received data stream in the time domain and the prefix-removed data stream is converted into a transformed signal in the frequency domain. A feedforward filter is used to implement a joint equalization and despreading operation by element-by-element multiplications in frequency domain. A feedback filter is used to remove the inter-symbol interference and update the feedforward filter through a feedback loop.

26 Claims, 5 Drawing Sheets

DIRECT-SEQUENCE CDMA METHOD AND DEVICE

FIELD OF THE INVENTION

The present invention relates generally to broadband transmission and, more particularly, to code division multiplex access (CDMA) communications.

BACKGROUND OF THE INVENTION

High bit-rate services such as multimedia transmission will result in frequency-selective fading and inter-symbol interference (ISI). The conventional technique to reduce ISI and the effects of frequency selective fading is to equalize in the time-domain (TD) in W-CDMA, for example. For broadband transmission, the complexity of equalization in TD could be very high because of the large number of channel impulse responses within the spectrum band. Multicarrier (MC) CDMA is an orthogonal frequency-division multiplexing (OFDM) scheme which divides the entire bandwidth into multiple narrow-band subcarriers and implements the spreading operation in the frequency domain (FD). See, for example, Hara et al. ("Overview of Multicarrier CDMA", IEEE Communications Magazine, pp. 126–133, December 1997). MC-CDMA is a promising technique to eliminate ISI and the effects of frequency selective fading. Furthermore, it just needs one-tap equalization due to the flat fading in each narrowband subcarrier. However, it has severe disadvantages such as difficulty in subcarrier synchronization and sensitivity to frequency offset and nonlinear amplification. In an MC-CDMA system, Peak-to-Average Ratio (PAR) and frequency offset degrade the system performance.

Figure 1:
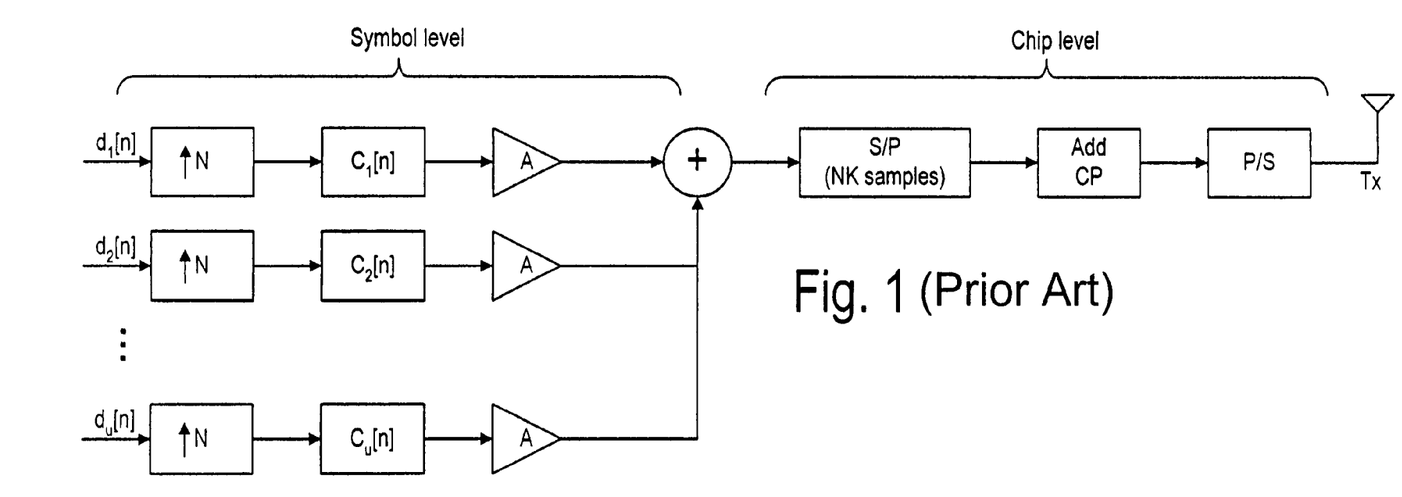
FIG. 1 is a block diagram showing a conventional CP-CDMA transmitter.
Figure 2:
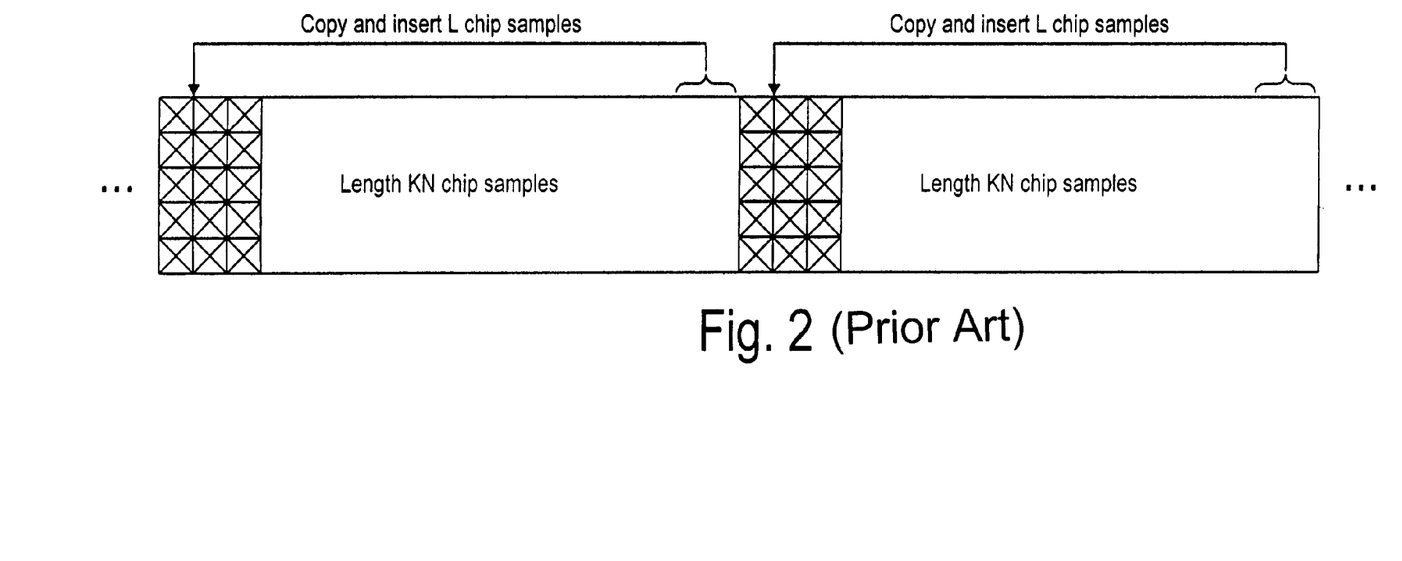
FIG. 2 is a block diagram illustrating the cyclic-prefix added to the block data at chip level.

Single-carrier modulation, which uses broadband equalization in the frequency domain, has been shown to have many advantages over multicarrier modulation. The single-carrier modulation systems have lower peak-to-average power ratio than multicarrier modulation systems. In particular, the single-carrier direct-sequence (DS) CDMA system with cyclic prefix (CP) has been proposed for broadband communications. As shown in FIG. 1, the cyclic prefix (CP) in the conventional CP-CDMA transmitter is added to the W-CDMA signals in the chip level. A plurality of transmitted symbols $d_u[n]$ are upsampled and filtered by assigned spreading codes $C_u[n]$. After the power in each code channel is allocated, the spread symbols of different code channels are summed up. Then, a serial-to-parallel converter is used to split the data stream into NK parallel samples. The last L chip samples of the data block are copied and added in front of the data block as CP, as shown in FIG. 2. The CP added data blocks are converted in a single data stream by a parallel-to-serial converter for transmission.

Figure 3:
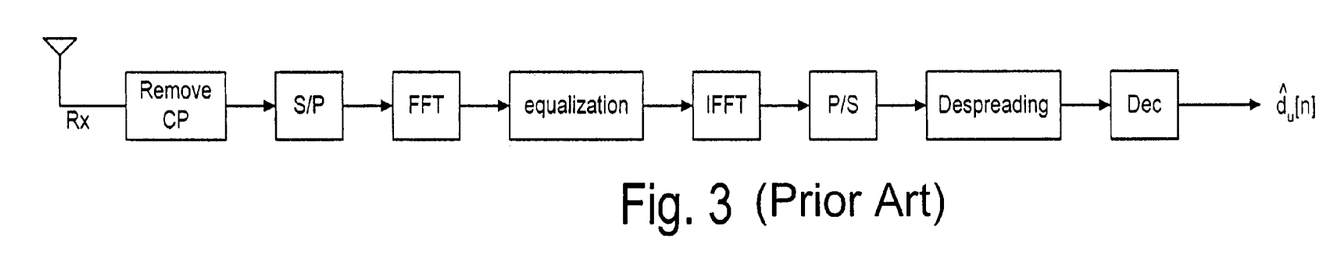
FIG. 3 is a block diagram showing a conventional CP-CDMA receiver.

At the receiver side, after CP is removed from the received signal, the signal is converted into a plurality of parallel streams by a serial-to-parallel converter and transformed into frequency domain by FFT (fast Fourier transform) operation, as shown in FIG. 3. The channel is equalized in the frequency domain and the equalized signals is transformed into time domain by IFFT (Inverse FFT). The output of the IFFT is converted to a single data stream by parallel-to-serial conversion and despread. The despread signal is fed to the channel decoder. The detailed description of the conventional CP-CDMA transceiver can be found in Baum et al. ("Cyclic-Prefix CDMA: An Improved Transmission Method for Broadband DS-CDMA Cellular systems" WCNC2002, Vo. 1, pp. 183–188) and Vook et al. ("Cyclic-Prefix CDMA with Antenna Diversity", VTC Spring 2002, IEEE 55th, Vol. 2, pp. 1002–1006).

The CP-CDMA system can be directly applied for current 3G W-CDMA systems by adding CP to the conventional W-CDMA signals in chip level. As such, the required modification on the transmitter side is negligible. However, the major drawback of the CP-CDMA is that the conventional receivers equalize the frequency domain and despread the signal in the time domain separately. Such a system does not give the optimum solution in the MMSE (Minimum Mean Square Error) criteria.

It is advantageous and desirable to provide a method and device for improving the CP-CDMA system performance.

SUMMARY OF THE INVENTION

The present invention adds symbol-level cyclic prefix (CP), instead of chip-level CP, into the conventional W-CDMA signals. In contrast to the conventional transceiver where equalization is carried out in frequency domain and despreading is separately carried out in time domain, the present invention improves CP-CDMA system performance by carrying out joint equalization and despreading in frequency domain. The present invention further improves the system performance by using a feedback filter to carry out interference cancellation with symbol-level decision feedback in time domain.

Thus, according to the first aspect of the present invention, there is provided a method of code division multiple access communications wherein a plurality of data streams in symbol-level for carrying a plurality of transmit symbols are combined in a summing process into at least one chip-level code stream for transmission. The method comprises:

adding a plurality of prefixes to the data streams in symbol-level for providing a plurality of further data streams indicative of the prefix-added data streams; and spread filtering the further data streams with a plurality of spread code signals for providing a plurality of spread data streams in a plurality of code channels prior to said summing process.

According to the present invention, each of the data streams carries one of said plurality of transmit symbols and each of the data streams is divided into a plurality of data blocks so as to allow the prefixes to be added to the data blocks for providing a plurality of prefix-added data blocks.

According to the present invention, each of the data blocks contains $K-L_{cps}$ samples, and each of the prefixes contain $L_{cps}$ symbols, and each of the prefix-added data blocks contain K samples.

According to the present invention, the plurality of prefix-added data blocks are combined into each of said prefix-added data streams prior to said spread filtering, and each of said prefix-added data streams is upsampled prior to said spread filtering.

According to the present invention, the transmitted chip-level code stream is received for providing a received signal indicative of the received chip-level code stream.

The method further comprises:

removing the prefixes from the received signal for providing a further signal in time domain indicative of a prefix-removed data stream; and converting the further signal into a transformed signal in frequency domain.

The method further comprises:

applying a plurality of feed-forward filter coefficients to the transformed signal for channel equalization in frequency domain and providing equalized signal for despreading, converting the despread signal into a further transformed signal in time domain, and filtering the further transformed signal with a feedback filter with previous hard decisions at each time instant for removing inter-symbol interference in the transformed signal, wherein the feedback filter comprises a plurality of feedback filter coefficients, and the feedback filter coefficients are updated if the fading channel is varied.

According to the present invention, the prefix-removed data stream is divided into a plurality of further data blocks, and each further data block contains NK samples so that said converting is carried out by a NK-sized FFT module.

The method further comprises:

applying a plurality of feed-forward filter coefficients to the transformed signal for channel equalization and providing a plurality of data blocks indicative of the equalized signal for despreading;

converting the despread data blocks by an NK-sized IFFT module for providing a plurality of transformed data blocks for despreading in the time domain;

combining the transformed data blocks into a transformed data stream in the time domain;

downsampling the transformed data stream;

computing the feedback filter coefficients if the fading channel is varied;

applying a feedback filter with the previous hard decisions at each time instant to the downsampled transformed data stream for removing inter-symbol interference in the downsampled transformed data stream; and updating the feed-forward coefficients with the feedback filter through a time-to-frequency transform module in a feedback loop.

Alternatively for simplified implementation, the method further comprises:

applying a plurality of feed-forward filter coefficients to the transformed signal for channel equalization and providing a plurality of data blocks indicative of the equalized signal for downsampling;

downsampling the data blocks for despreading;

converting the downsampled data blocks by a K-sized IFFT module for providing a plurality of transformed data stream in the time domain;

computing the feedback filter coefficients if the fading channel is varied applying a feedback filter to the transformed data stream with the previous hard decisions at each time instant for removing inter-symbol interference in the transformed data stream, and updating the feed-forward filter coefficients with the feedback filter through a time-to-frequency transform module in a feedback loop.

According to a second aspect of the present invention, there is provided a transmitter for use in code division multiple access communications wherein a plurality of data streams in symbol-level for carrying a plurality of transmit symbols are combined in a summing process into at least one chip-level code stream for transmission. The transmitter comprises:

a plurality of first modules, for adding a plurality of prefixes to the data streams in symbol-level for providing a plurality of further data streams indicative of the prefix-added data streams; and a plurality of second modules, responsive to the further data streams, for spread filtering the prefix-added data streams by a plurality of spread code signals prior to said summing process.

According to the present invention, each of the data streams carries one of said plurality of transmit symbols. The transmitter further comprises a plurality of third modules, for dividing each of the data streams into a plurality of data blocks so as to allow the first modules to add the prefixes to the data blocks for providing a plurality of prefix-added data blocks; and a plurality of fourth modules for combining said plurality of prefix-added data blocks into each of said prefix-added data streams prior to said spread filtering.

According to the third aspect of the present invention, there is provided a receiver for use in code division multiple access communications wherein a plurality of data streams in symbol-level for carrying out a plurality of transmit symbols are combined in a summing process into at least one chip-level code stream for transmission, and wherein a plurality of prefixes are added to the data streams and a plurality of spread code signals are used for spread filtering the prefix-added data streams prior to said summing process for providing the chip-level code stream. The receiver comprises:

an antenna for receiving a signal indicative of the chip-level code stream;

a first module, responsive to the received signal, for removing the prefixes from the chip-level code stream for providing a prefix-removed code stream in time domain;

a second module, for converting the prefix-removed code stream into a transformed signal in frequency domain; and a third module, for applying a plurality of feed-forward filter coefficients to the transformed signal for channel equalization in frequency domain and providing equalized signal for despreading.

According to the present invention, the receiver further comprises:

a fourth module, for converting the equalized signal into a further transformed signal in time domain, and a fifth module for removing inter-symbol interference based on previous hard decisions in the further transformed signal in time domain.

According to the fourth aspect of the present invention, there is provided a network component in a code division multiple access communications network wherein a plurality of data streams in symbol-level for carrying out a plurality of transmit symbols are combined in a summing process into at least one chip-level code stream for transmission. The network component comprises:

a transmitter comprising:

a plurality of first modules, for adding a plurality of prefixes to the data streams in symbol-level for providing a plurality of further data streams indicative of the prefix-added data streams, and a plurality of second modules, responsive to the further data streams, for spread filtering the prefix-added data streams by a plurality of spread code signals prior to said summing process; and a receiver comprising:

a third module for removing the prefixes from the chip-level code stream for providing a prefix-removed code stream in time domain, and a fourth module, for converting the prefix-removed code stream into a transformed signal in frequency domain.

According to the present invention, the transmitter further comprises:
a plurality of fifth modules, for dividing said each of the data streams into a plurality of data blocks so as to allow the first modules to add the prefixes to the data block for providing a plurality of prefix-added data blocks; and
a plurality of sixth modules, for combining said plurality of prefix-added data blocks into each of said prefix-added data streams prior to said spread filtering.

The receiver further comprises:
a seventh module, for applying a plurality of feed-forward filter coefficients to the transformed signal for channel equalization in frequency domain and providing equalized signal for despreading;
an eighth module, for converting the equalized signal into a further transformed signal in time domain; and
a ninth module for removing inter-symbol interference in the further transformed signal in time domain based on previous hard decisions.

The network component can be a mobile terminal or the like.

The present invention will become apparent upon reading the description taken in conjunction with FIGS. 4 to 9.

DETAILED DESCRIPTION OF THE INVENTION

Figure 4:
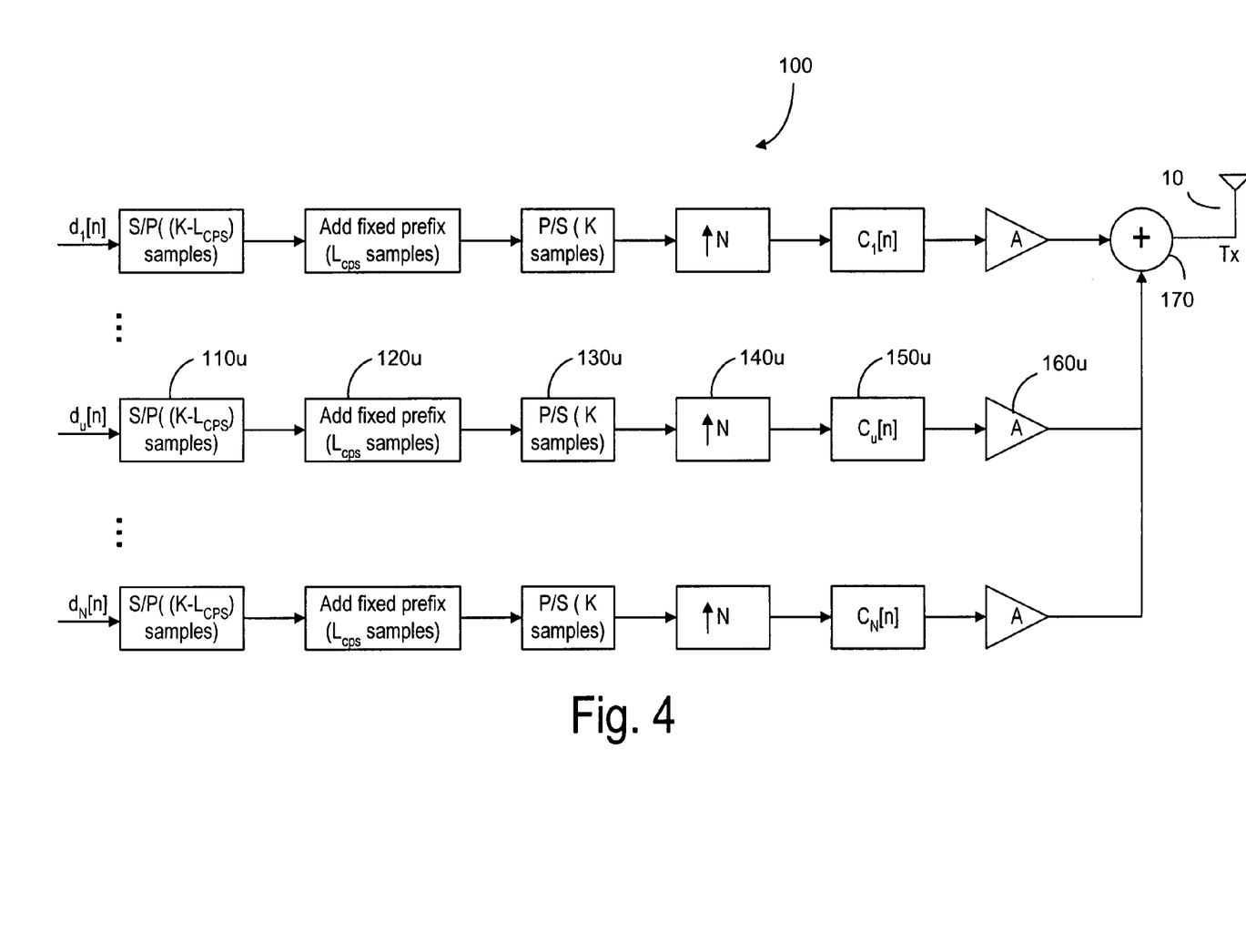
FIG. 4 is a block diagram showing a CP-CDMA transmitter, according to the present invention.
Figure 5:
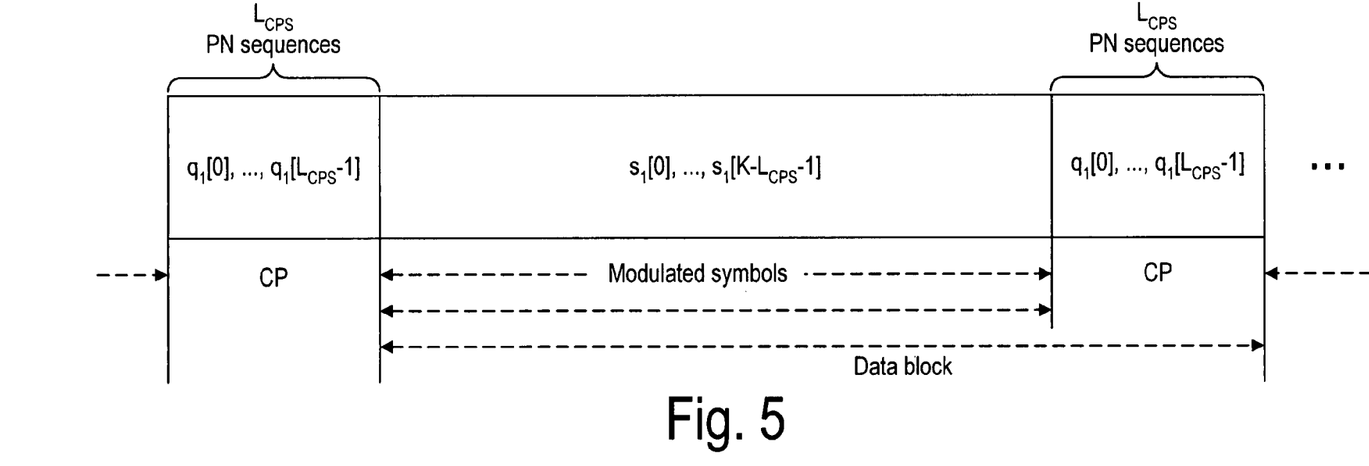
FIG. 5 is a block diagram showing the transmitted signal before spreading for the first code channel.
Figure 6:
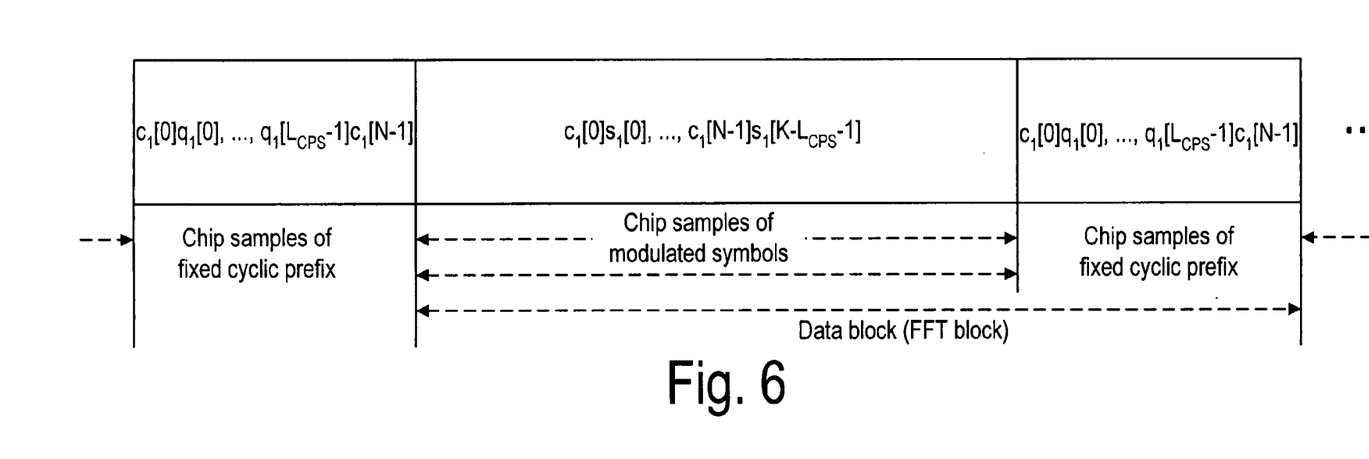
FIG. 6 is a block diagram showing the transmitted signal after spreading for the first code channel.

In contrast to the conventional CP-CDMA where the cyclic prefix (CP) is added in chip level, the symbol-level CP is added to the CDMA signals in the transmitter, according to the present invention. In the transmitter 100 as shown in FIG. 4, the transmitted symbols $d_u[n]$ are converted by a plurality of serial-to-parallel converters $110_u$ into a plurality of data blocks with size (K-$L_{cps}$) of all the U code channels or users, and $L_{cps}$ known symbols of the data block are added in front of the data block by block $120_u$. The CP added data block are converted by a parallel-to-serial converters $130_u$ to a series of CP-added symbols. After being upsampled by blocks $140_u$, the CP-added symbols for the $u^{th}$ code channel is filtered by spread code $c_u[n]$ in block $150_u$. $c_u[n]$ is the $u^{th}$ user's spread code with a spread factor N. After the power of each code channel is allocated by block $160_u$, the code channels are combined by a summing module 170 for transmission via antenna 10. The details on symbol-level CP adding are illustrated in FIG. 5. The transmitted signal with the symbol-level CP after spreading is shown in FIG. 6.

The data block m[n] with CP can be expressed in chip-level as $$m[n] = \sum_{u=1}^{U} \sum_{k=-L_{CPS}}^{K-1} A d_u[k] c_u[n - NK], \quad (1)$$

$$n = -NL_{CPS}, \cdots, NK - 1$$

where U denotes the number of active spreading codes, $$A = \frac{1}{\sqrt{N}}$$

denotes power control factor, $L_{CPS}$ is the length of fixed CP composed of PN sequences $q_u[n]$, K is the number of transmitted symbols including CP over one data block period and $d_u[n]$ is defined as $$d_u[n] = \begin{cases} q_u[n + L_{CPS}], & -L_{CPS} \le n \le -1 \\ s_u[n], & 0 \le n \le K - L_{CPS} - 1 \\ q_u[n - K + L_{CPS}], & K - L_{CPS} \le n \le K - 1 \end{cases} \quad (2)$$

The discrete-time received signal in chip-level is $$r[n] = \sum_{l=0}^{L_h-1} p[l] m[n - l] + v[n], n = -NL_{CPS}, \cdots, NK - 1 \quad (3)$$

where p[l] denotes the equivalent channel impulse response, v[n] is complex additive white Gaussian noise (AWGN) with the variance $\sigma_v^2$, and $NL_{CPS}$ is larger than the maximum delay spread $L_h$. After the CP is removed from the data block, the received signal through the FFT function can be expressed in frequency domain as $$R[f] = P[f] DFT\{m[n]\} + V[f] \quad (4)$$

$$= P[f] \sum_{u=1}^{U} \sum_{k=0}^{K-1} A d_u[k] e^{-j2\pi kf/K}$$

$$\sum_{n=0}^{NK-1} c_u[n - NK] e^{-j2\pi (n-Nk)f/NK} + V[f]$$

$$= P[f] \sum_{u=1}^{U} \sum_{k=0}^{K-1} A d_u[k] e^{-j2\pi kf/K}$$

$$\sum_{n=0}^{N-1} c_u[n] e^{-j2\pi nf/NK} + V[f]$$

-continued $$= P[f] \sum_{u=1}^{U} A D_u^K[f] C_u[f] + V[f]$$

$$f = 0, 1, \cdots, NK - 1$$

where P[f] denotes the NK-sized FFT of p[l], $D_u^K[f]$ denotes K-sized FFT of $d_u[n](n=0, \ldots, K)$, $C_u[f]$ denotes the NK-sized FFT of the $u^{th}$ spread code, and V[f] denotes the NK-sized FFT of the noise v[n]. The discrete Fourier transform function DFT{m[n]} is defined as $$DFT\{m[n]\} = \sum_{n=0}^{NK-1} m[n] e^{-j2\pi nf/NK}, f = 0, 1, \cdots, NK - 1 \quad (5)$$

Figure 7:
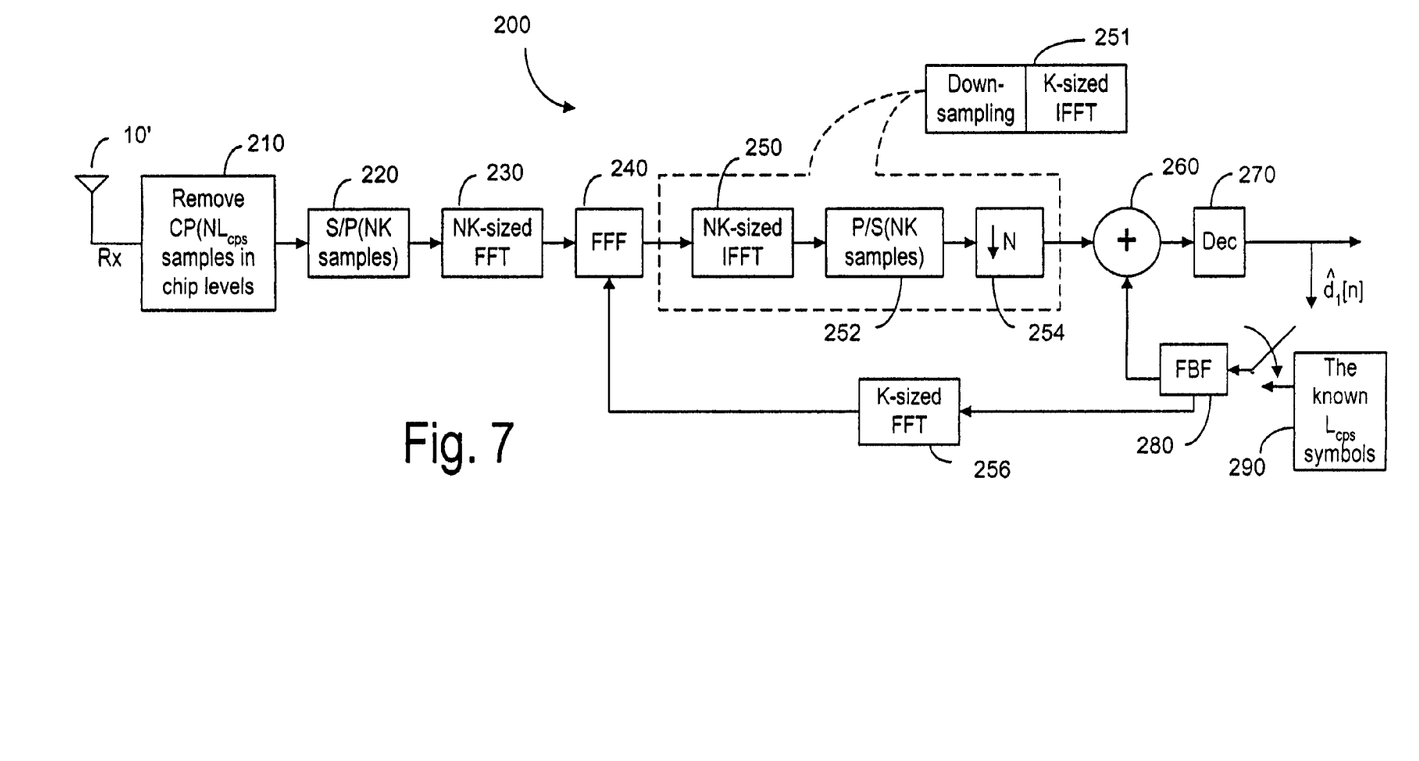
FIG. 7 is a block diagram showing a CP-CDMA receiver, according to the present invention.

FIG. 7 illustrates a receiver 200, according to the present invention. In order to achieve optimum and sub-optimum solution in MMSE sense, the present invention uses a feed-forward filter (FFF) to implement the joint equalization and despreading operation by element-by-element multiplications in FD, and a feedback filter (FBF) to regenerate and subtract the interference based on the previous hard decisions in TD. As shown in FIG. 7, the signal received via the antenna 10' is processed by block 210 to remove CP by frame synchronization. The serial-to-parallel conversion is implemented in block 220, and the NK-sized FFT block 230 is used to transform the received signal with CP removed into frequency domain (FD). The feed-forward filter (FFF) 240 implements the joint equalization and despreading operation by element-by-element multiplications in FD, where FFF filter coefficients are updated by a feedback loop through the K-sized FFT block 256. The FFF output is then transformed into time domain (TD) by inverse fast Fourier transform (IFFT) by the NK-sized IFFT block 250, processed by the parallel-to-serial converter block 252 and downsampled by block 254. The residual inter-symbol interference (ISI) in the corresponding code channel is regenerated and cancelled in symbol-level by the feedback filter with previous hard decisions in block 280. The feedback filter has a plurality of filter coefficients, which are computed if the fading channel is varied.

For the simplicity of expression on the optimum filter design and related analysis, the fully-loaded system is emphasized. All the code channels are allocated to either the desired user equipment (UE) or other UEs. Furthermore, the joint detection scheme with symbol level decision feedback for the $1^{st}$ code channel is given in the following analysis, where the same process can be straightforward applied for the detection of other code channels.

Joint Equalization and Despreading

After joint equalizing and despreading in frequency domain with FFF coefficients $W_1[f]$, the output with NK-sized IFFT can be expressed as $$\tilde{y}_1[n] = IDFT\{W_1[f]R[f]\} \quad (6)$$

$$= IDFT\{AW_1[f]P[f]C_1[f]D_1^K[f]\} +$$

$$\sum_{u=2}^{U} IDFT\{AW_1[f]P[f]C_u[f]D_u^K[f]\} +$$

$$IDFT\{W_1[f]V[f]\}$$

$$= IDFT\{A\tilde{H}_{1,1}[f]D_1^K[f]\} +$$

$$\sum_{u=2}^{U} IDFT\{A\tilde{H}_{1,u}[f]D_u^K[f]\} + \tilde{v}[n],$$

$$n = 0, 1, \cdots, NK - 1$$

where $$\tilde{H}_{1,u}[f] = W_1[f]P[f]C_u[f], f=0,1, \ldots, NK-1 \quad (7)$$

$$\tilde{v}[n] = IDFT\{W_1[f]V[f]\} \quad (8)$$

The output of IFFT in time domain consists of the desired signal with the residual ISI, inter-code interference (ICI) and noise terms as in Equation (6). The desired signal with the residual ISI as the first term of Equation (6) can be rewritten as $$\tilde{d}_1[n] = IDFT\{A\tilde{H}_{1,1}[f]D_1^K[f]\} \quad (9)$$

$$= A\tilde{h}_{1,1}[n] \otimes \left(\sum_{k=0}^{K-1} d_1[k]\delta[n - NK]\right)$$

$$= A\sum_{k=0}^{K-1} \tilde{h}_{1,1}[n - Nk]_{(NK)} d_1[k]$$

$$n = 0, 1, \cdots, NK - 1$$

where $\otimes$ denotes the circular convolution operation, $\tilde{h}_{1,1}[n]$ is the NK-sized IFFT of $\tilde{H}_{1,1}[f]$, the operation $[n]_N$ is defined as $$[n]_{(N)} = [n - x \times N] \quad (10)$$

where x denotes the element of n/N to the nearest integers towards minus infinity. The Kronecker delta function is defined as $$\delta[n] = \begin{cases} 1, & n = 0 \\ 0, & others \end{cases} \quad (11)$$

With the same derivation, the second terms can be expressed as $$\tilde{I}_1[n] = \sum_{u=2}^{U} IDFT\{AW_1[f]P[f]C_u[f]D_u^K[f]\} \quad (12)$$

$$= \sum_{u=2}^{U} A\sum_{k=0}^{K-1} d_u[k]\tilde{h}_{1,u}[n - Nk]_{(NK)}$$

where $\tilde{h}_{1,u}[n]$ is the NK-sized IFFT of $\tilde{H}_{1,u}[f]$.

It should be appreciated from Equation (9) that the desired signal with the residual ISI is spaced with N chips after joint equalization and despreading so that there is no need for despreading as in the conventional receiver but only simple downsampling in TD. As can be seen in Appendix D, if NK-sized IFFT of Equation (9) and downsampling is jointly implemented, only a downsampling and K-sized IFFT operation is needed, as shown as block 251 in FIG. 7.

After downsampling, the output is $$\hat{y}[n] = \tilde{y}[nN] \qquad (13)$$
$$= d'_1[n] + I_1[n] + v_1[n]$$

where the desired signal with the residual ISI can be expressed as $$d'_1[n] = \tilde{d}_1[nN] \qquad (14)$$
$$= A \sum_{k=0}^{K-1} \tilde{h}_{1,1}[(n-k)N]_{(NK)} d_1[k] \qquad n = 0, 1, \cdots, K-1$$

Symbol-Level Feedback

The inter-code interference and noise term are expressed as $$I_1[n] = \tilde{I}_1[Nn] = \sum_{u=2}^{U} A \sum_{k=0}^{K-1} d_u[k] \tilde{h}_{1,u}[(n-k)N]_{(NK)} \qquad (15)$$

and $$v_1[n] = \tilde{v}_1[nN] \qquad (16)$$

Applying the feedback filter setting and then canceling the residual ISI with previous hard decisions, the decision variable at time instant n can be written as $$\hat{y}_1[n] = d'_1[n] + \sum_{l=1}^{L_{CPS}} b_{1,l} \hat{d}_1[n-l] + I_1[n] + v_1[n], \qquad (17)$$
$$n = 0, 1, \cdots, K - L_{CPS} - 1$$

where the decision feedback signal $\hat{d}_1[n]$ can be defined as $$\hat{d}_1[n] = \begin{cases} q_1[n + L_{CPS}], & -L_{CPS} \leq n \leq -1 \\ \hat{s}_1[n], & 0 \leq n \leq K - L_{CPS} - 1 \end{cases} \qquad (17.1)$$

which consists of known CP and the previous hard decisions. The FBF (feedback filter) coefficients for the $1^{st}$ code channel are denoted by $b_1 = [b_{1,1}, \ldots, b_{1,L_{cps}}]^T$, where $[.]^T$ denotes the transpose operation.

Since the $L_{CPS}$ symbol-level CP is known at UE so that it will not be taken into account, the hard decision at time instant n is $$\hat{s}_1[n] = \text{Dec}(\hat{y}[n]) \qquad (17.2)$$

Where Dec() denotes the slicing operation appropriate to the constellation.

Assuming the previous hard decisions are correct, the mean square error of the first code channel can be written as $$J = E\left\{\left|d'_1[n] + \sum_{l=1}^{L_{CPS}} b_{1,l} d_1[n-l] + I_1[n] + v_1[n] - d_1[n]\right|^2\right\}, \qquad (18)$$
$$= E\left\{\left|d'_1[n] + \sum_{l=1}^{L_{CPS}} b_{1,l} d_1[n-l] - d_1[n]\right|^2\right\} +$$
$$E\{|v_1[n]|^2\} + E\{|I_1[n]|^2\}$$
$$n = 0, 1, K - L_{CPS} - 1$$

The mean square error can be expressed in frequency domain as $$J = \frac{1}{K} \sum_{f=0}^{K-1} |AH_{1,1}[f] + B_1[f] - 1|^2 + \qquad (19)$$
$$\frac{\sigma_v^2}{KN} \sum_{f=0}^{NK-1} |W_1[f]|^2 + \frac{1}{K} \sum_{u=2}^{U} \sum_{f=0}^{K-1} A^2 |H_{1,i}[f]|^2$$

where $B_1[f]$ is K-sized FFT of $b_1$ and $H_{1,i}[f]$ is defined in Equation (31). The details in the derivation of Equation (19) are given in appendix A. It is difficult to design the optimum filter settings for arbitrary code channels. For simplicity of filter design and analysis, only the optimum solution is presented for the fully loaded CP-CDMA system, where all the code channels are allocated to either the desired UE or others. Applying gradient method to Equation (19) when code channels are fully used, FFF coefficients can be obtained as $$W_1[f] = \frac{AP^*[f]C_1^*[f](1 - B_1[f]_{(K)})}{|P[f]|^2 + \sigma_v^2}, \quad f = 0, 1, \cdots, NK - 1 \qquad (20)$$

where * denotes complex conjugate transpose. The detailed derivation of Equation (20) is given in appendix B.

Substituting Equation (20) into Equation (19) and applying gradient method again, we can obtain $$b_1 = S_1^{-1} P_1 \qquad (21)$$

where $$S_1 = \sum_{f=0}^{K-1} \left\{ \sum_{n=0}^{N-1} \left(1 - \frac{A^2 |P[f+nK]C_1[f+nK]|^2}{|P[f+nK]|^2 + \sigma_v^2}\right) \right\} E^*[f] E^T[f] \qquad (22)$$

$$P_1 = \sum_{f=0}^{K-1} \left\{ \sum_{n=0}^{N-1} \left(1 - \frac{A^2 |P[f+nK]C_1[f+nK]|^2}{|P[f+nK]|^2 + \sigma_v^2}\right) \right\} E^*[f] \qquad (23)$$

and $$E[f] = [e^{-j2\pi f/K}, \ldots, e^{-j2\pi f L_{CPS}/K}]^T \qquad (24)$$

The details on the derivation of Equation (21) are given in appendix C. It should be noted that the entries of matrix $S_1$ and the vector $P_1$ can be computed using FFT algorithms. Since the matrix $S_1$ is a Toepliz matrix, a low complexity algorithm can be used to solve Equation (21).

Alternative Structure of known Symbol-Level CP

As mentioned above, the CP should be fixed and known by the UE in the transceiver, according to the present invention. The joint equalization and despreading in FD (FFF filter design) along with symbol-level decision feedback in TD can be optimized with the knowledge of CP and the interference can be suppressed in by FBF. The receiver can be easily optimized in MMSE sense for fully loaded symbol-level CP-CDMA system if CP is PN sequences and different CPs are used for different code channels. However, only one fixed CP can be used in one code channel where zeros are added as CP for the rest of code channels. It is equivalent that the CP is shared by multiple code channels for joint equalization and despreading in FD and interference cancellation in TD. By using shared CP, the memory demanding for CP in UE can be reduced into minimum and a slight performance gain can be achieved due to less interference from CP.

Sub-Optimum Solution for Non-Fully-Loaded System

When the CP-CDMA system is not fully loaded, it is difficult to design the optimum filter settings in MMSE sense. In the present invention, a sub-optimum filter design for arbitrary code channels is based on SNR (signal-to-noise ratio) with minor modifications on the optimum filter design as in Equation (20) for fully-loaded system. The sub-optimum FFF setting is $$W_1^{Sub}[f] = \frac{AP^*[f]C_1^*[f](1 - B_1^{Sub}[f]_{(K)})}{|P[f]|^2 + N\sigma_v^2/U}, \quad (25)$$
$$f = 0, 1, \cdots, NK - 1$$

where $B_1^{Sub}[f]$ is the K-sized FFT of the sub-optimum feedback filter setting $b_1^{Sub}$, and the sub-optimum feedback filter setting is $$b_1^{Sub} = S_1^{-1} P_1 \quad (26)$$

where $$S_1 = \quad (27)$$
$$\sum_{f=0}^{K-1} \left\{ \sum_{n=0}^{N-1} \left(1 - \frac{A^2|P[f+nK]C_1[f+nK]|^2}{|P[f+nK]|^2 + N\sigma_v^2/U}\right) \right\} E^*[f]E^T[f]$$

$$P_1 = \sum_{f=0}^{K-1} \left\{ \sum_{n=0}^{N-1} \left(1 - \frac{A^2|P[f+nK]C_1[f+nK]|^2}{|P[f+nK]|^2 + N\sigma_v^2/U}\right) \right\} E^*[f] \quad (28)$$

When the number of the active code channels U is equal to N or the CP-CDMA is fully loaded, the sub-optimum filter settings as shown in Equation (25) and Equation (26) are identical to the optimum filter settings as shown in Equation (20) and Equation (21).

In sum, the present invention provides a CP-CDMA transmission structure and the corresponding joint equalization and despreading with feedback and interference cancellation, where the symbol-level CP is added to the CDMA signals in the transmitter. In contrast, in the conventional CP-CDMA, the CP is added in chip level. The known CP is used for interference cancellation and optimization of the joint equalization and despreading in MMSE sense for fully loaded symbol-level CP-CDMA system where all the code channels are allocated to either the desired user equipment (UE) or the others. Alternative CP structure and the suboptimum solution for the non-fully-loaded systems have also been disclosed for broad applications.

Figure 8:
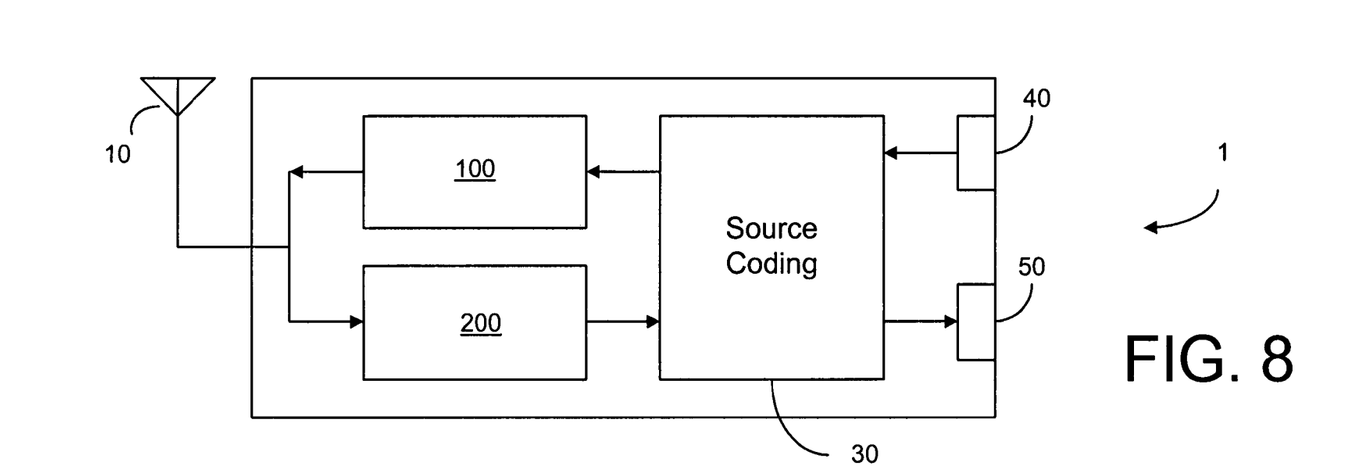
FIG. 8 is a schematic representation illustrating an electronic device having a CP-CDMA transceiver, according to the present invention.

FIG. 8 illustrates a typical communication device that uses the transceiver, according to the present invention. As shown, the communication device 1 comprises an antenna 10 to be shared with the transmitter 100 and the receiver 200, according to the present invention. The transmitter 100 and the receiver 200 are linked to a microphone 40 and a speaker 50 via a source coding module 30 where the sound signal from the microphone is encoded and where the received sound signal is decoded. The communication device 1 can be a mobile phone, for example.

Figure 9:
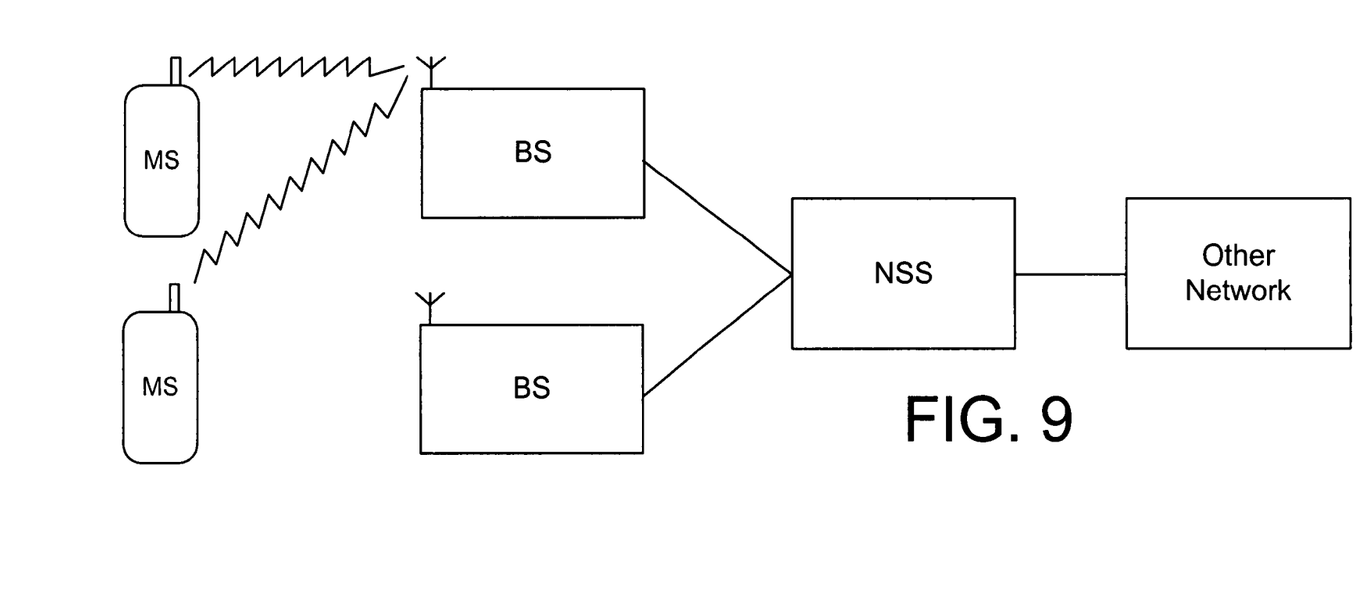
FIG. 9 is a schematic representation illustrating a communications network having communication components that use the CP-CDMA transmitter and receiver, according to the present invention.

FIG. 9 is a schematic representation of a communication network that can be used for DS-CDMA communications, according to the present invention. As shown in the figure, the network comprises a plurality of base stations (BS) connected to a switching sub-station (NSS), which may also be linked to other network. The network further comprises a plurality of mobile stations (MS) capable of communicating with the base stations. The mobile station can be a mobile phone, which is usually referred to as a complete terminal. The mobile station can also be a module for terminal without a display, keyboard, battery, cover etc. The transmitter 100 and the receiver 200 can be located in the base station, the switching sub-station or in another network.

Appendix A

After jointly despreading and equalization in frequency domain and then downsampling in time domain, the equivalent channel response for the i-th code channel is $$h_{1,i}[n] = \tilde{h}_{1,i}[nN] = \frac{1}{NK} \sum_{f=0}^{NK-1} \tilde{H}_{1,i}[f] e^{j2\pi fn/K}, \quad (29)$$
$$n = 0, 1, \cdots, K - 1$$

and the K-sized FFT of $h_{1,i}[n]$ can be expressed as $$H_{1,i}[f] = \sum_{n=0}^{K-1} h_{1,i}[n] e^{-j2\pi fn/K}, \quad f = 0, 1, \cdots, K - 1 \quad (30)$$

Substituting Equation (29) into Equation (30), we obtain $$H_{1,i}[f] = \frac{1}{NK} \sum_{n=0}^{K-1} \sum_{f_1=0}^{NK-1} \tilde{H}_{1,i}[f_1] e^{j2\pi f_1 n/K} e^{-j2\pi fn/K} \quad (31)$$
$$= \frac{1}{N} \sum_{f_1=0}^{NK-1} \tilde{H}_{1,i}[f_1] \delta[f - f_1]_{(K)}$$

-continued $$= \frac{1}{N}\sum_{n=0}^{N-1} \tilde{H}_{1,i}[f - nK]_{(NK)}, \quad f = 0, 1, \cdots, K-1$$

The first term of Equation (18) can be expressed in frequency domain as $$E\left\{\left|d_1'[n] + \sum_{l=1}^{L_{CFS}} b_{1,l}\hat{d}_1[n-l] - d_1[n]\right|^2\right\} = \qquad (32)$$

$$\frac{1}{K}\sum_{f=0}^{K-1}|AH_{1,1}[f] - 1 + B_1[f]|^2$$

The inter-code interference term can be expressed in frequency domain as $$E\{|I_1[n]|^2\} = \frac{A^2}{K}\sum_{u=2}^{U}\sum_{f=0}^{K-1}|H_{1,u}[f]|^2 \qquad (33)$$

The noise term of Equation (18) can be expressed in frequency domain as $$E\{|v_1[n]|^2\} = \frac{1}{K^2}\sum_{f=0}^{K-1}|V_1[f]|^2 \qquad (34)$$

where $V_1[f]$ denotes K-sized FFT of $v_1[n]$. Substituting Equation (8) and Equation (16) into Equation (34), we can obtain $$E\{|v_1[n]|^2\} = \frac{1}{K^2}\sum_{f=0}^{K-1}\sum_{k_1,k_2=0}^{NK-1}\sum_{i_1,i_2=0}^{K-1} w_1[k_1]w_1^*[k_2] \qquad (35)$$

$$E\{v[i_1N - k_1]_{(NK)}v^*[i_2N - k_2]_{(NK)}\}$$

$$e^{-j2\pi i_1 f/K}e^{j2\pi i_2 f/K}$$

where $w_1[k]$ denotes the IFFT of $W_1[k]$. We can express Equation (35) as $$E\{|v_1[n]|^2\} = \frac{1}{K}\sum_{k_1,k_2=0}^{NK-1}\sum_{i_1,i_2=0}^{K-1} \sigma_v^2 w_1[k_1]w_1^*[k_2]\delta[i_1 - i_2]_{(K)} \qquad (36)$$

$$\delta[(i_1-i_2)N - (k_1-k_2)]_{(NK)}$$

$$= \sigma_v^2 \sum_{k=0}^{NK-1}|w_1[k]|^2 \qquad (37)$$

$$= \frac{\sigma_v^2}{NK}\sum_{k=0}^{NK-1}|W_1[k]|^2 \qquad (38)$$

From Equations (32), (33) and (38), the mean square error expression of Equation (19) in frequency domain can be obtained.

Appendix B

In the following, the weight coefficients in Equation (20) for the full code channel usage case are derived. First, a lemma on orthogonal spread codes is given.

Lemma $$\sum_{u=1}^{N} C_u[f + j_1K]C_u^*[f + j_2K] = N^2\delta[j_1 - j_2], \qquad (39)$$

$$f = 0, 1, \cdots, K-1, \quad j_1, j_2 = 0, 1, \cdots, N-1$$

Proof:

$$\sum_{u=1}^{N} C_u[f + j_1K]C_u^*[f + j_2K] = \sum_{q_1,q_2=0}^{N-1}\sum_{u=1}^{N} c_u[q_1]c_u[q_2] \qquad (40)$$

$$e^{-2\pi j(f+j_1K)q_1/NK}$$

$$e^{2\pi j(f+j_2K)q_2/NK}$$

Due to orthogonality of the spread code, Equation (40) can be rewritten as $$\sum_{u=1}^{N} C_u[f + j_1K]C_u^*[f + j_2K] = N\sum_{q_1,q_2=0}^{N-1} e^{-2\pi j(f+j_1K)q_1/NK} \qquad (41)$$

$$e^{2\pi j(f+j_2K)q_2/NK}\delta[q_1 - q_2]$$

$$= N\sum_{q=0}^{N-1} e^{-2\pi jq(j_1-j_2)/N}$$

$$= N^2\delta[j_1 - j_2]$$

For the full code channel usage case, we can obtain $$\frac{\partial J}{\partial W_1[f]} = -\frac{2A}{NK}P^*[f]C_1^*[f](1 - B_1[f]_{(K)}) + \qquad (42)$$

$$\frac{2\sigma_v^2}{NK}W_1[f] + \frac{2A^2}{NK}\sum_{u=1}^{N} H_{1,u}[f]P^*[f]C_u^*[f]$$

Substituting Equation (7) and Equation (31) into Equation (42), we can obtain $$\frac{\partial J}{\partial W_1[f]} = -\frac{2A}{NK}P^*[f]C_1^*[f](1 - B_1[f]_{(K)}) + \qquad (43)$$

$$\frac{2\sigma_v^2}{NK}W_1[f] + \frac{2A^2}{N^2K}\sum_{n=0}^{N-1} W_1[f - nK]_{(NK)}$$

$$P[f - nK]_{(NK)}P^*[f]\sum_{u=1}^{N} C_u[f - nK]_{(NK)}C_u^*[f]$$

Applying the lemma on orthogonal spread codes to Equation (42), we obtain $$\frac{\partial J}{\partial W_1[f]} = -\frac{2A}{NK} P^*[f] C_1^*[f](1 - B_1[f]_{(K)}) + \frac{2\sigma_v^2}{NK} W_1[f] + \frac{2}{NK} W_1[f] |P[f]|^2 \quad (44)$$

Accordingly, the optimum coefficients for the full code channel usage case can be expressed as $$W_1[f] = \frac{AP^*[f] C_1^*[f](1 - B_1[f]_{(K)})}{|P[f]|^2 + \sigma_v^2}, f = 0, 1, \cdots, NK-1 \quad (45)$$

Appendix C

The K-sized FFT of $b_1$ can be expressed in vector form as $$B_1[f] = E^T[f] b_1 \quad (46)$$

Substituting Equation (7) into Equation (46), the first term of Equation (19) can be expressed as $$\text{The first term} = \frac{1}{K} \sum_{f=0}^{K-1} \left| \frac{A}{N} \sum_{n=0}^{N-1} \tilde{H}_{1,i}[f - nK]_{(NK)} - 1 + E^T[f] b_1 \right|^2 \quad (47)$$

The gradient of the first term can be expressed as $$\frac{\partial \text{The first term}}{\partial b_1} = \quad (48)$$

$$\left\{ \frac{2A^4}{KN^2} \sum_{f=0}^{K-1} \sum_{j_1 \cdot j_2=0}^{N-1} \frac{|P[f+j_1K]|^2 |P[f+j_2K]|^2 |C_1[f+j_1K]|^2 |C_1[f+j_2K]|^2}{(|P[f+j_1K]|^2 + \sigma_v^2)(|P[f+j_2K]|^2 + \sigma_v^2)} E^*[f] E^T[f] - \right.$$

$$\left. \frac{4}{N^2 K} \sum_{f=0}^{K-1} \sum_{j=0}^{N-1} \frac{|P[f+jK]|^2 |C_1[f+jK]|^2}{(|P[f+jK]|^2 + \sigma_v^2)} E^*[f] E^T[f] + 2I \right\} b_1 +$$

$$\frac{2A^4}{KN^2} \sum_{f=0}^{K-1} \sum_{j_1 \cdot j_2=0}^{N-1} \frac{|P[f+j_1K]|^2 |P[f+j_2K]|^2 |C_1[f+j_1K]|^2 |C_1[f+j_2K]|^2}{(|P[f+j_1K]|^2 + \sigma_v^2)(|P[f+j_2K]|^2 + \sigma_v^2)} E^*[f] -$$

$$\frac{4A^2}{NK} \sum_{f=0}^{K-1} \sum_{j=0}^{N-1} \frac{|P[f+jK]|^2 |C_1[f+jK]|^2}{(|P[f+jK]|^2 + \sigma_v^2)} E^*[f] + \frac{2}{K} \sum_{f=0}^{K-1} E^*[f]$$

where I denotes identity matrix. The gradient of the second term can be expressed as $$\frac{\partial \text{The second term}}{\partial b_1} = \quad (49)$$

$$\frac{2\sigma_v^2 A^2}{KN} \sum_{f=0}^{NK-1} \frac{|P[f]|^2 |C_1[f]|^2}{(|P[f]|^2 + \sigma_v^2)^2} E^*[f] E^T[f] b_1 -$$

$$\frac{2\sigma_v^2 A^2}{KN} \sum_{f=0}^{NK-1} \frac{|P[f]|^2 |C_1[f]|^2}{(|P[f]|^2 + \sigma_v^2)^2} E^*[f]$$

The gradient of the third term can be expressed as $$\frac{\partial \text{The third term}}{\partial b_1} = \quad (50)$$

$$\frac{2A^4}{KN^2} \sum_{u=2}^{N} \sum_{f=0}^{K-1} \sum_{j_1 \cdot j_2=0}^{N-1} |P[f+j_1K]|^2 |P[f+j_2K]|^2 C_1[f+j_1K] C_1[f+j_2K]^* +$$

$$\frac{C_u^*[f+j_1K]}{(|P[f+j_1K]|^2 + \sigma_v^2)} \frac{C_u[f+j_2K]}{(|P[f+j_2K]|^2 + \sigma_v^2)} E^*[f] E^T[f] b_1 -$$

$$\frac{2A^4}{KN^2} \sum_{u=2}^{N} \sum_{f=0}^{K-1} \sum_{j_1 \cdot j_2=0}^{N-1} |P[f+j_1K]|^2 |P[f+j_2K]|^2 C_1[f+j_1K] C_1[f+j_2K]^* +$$

$$\frac{C_u^*[f+j_1K]}{(|P[f+j_1K]|^2 + \sigma_v^2)} \frac{C_u[f+j_2K]}{(|P[f+j_2K]|^2 + \sigma_v^2)} E^*[f]$$

Combining Equations (48) (49) (50) and then applying the lemma on the orthogonal spread codes, the gradient of the mean square error can be expressed as $$\frac{\partial J}{\partial b_1} = \frac{1}{KN} \sum_{f=0}^{K-1} \left\{ \sum_{n=0}^{N-1} \left( 1 - \frac{A^2 |P[f+nK] C_1[f+nK]|^2}{|P[f+nK]|^2 + \sigma_v^2} \right) \right\} E^*[f] E^T[f] b_1 \quad (51)$$

$$- \frac{1}{KN} \sum_{f=0}^{K-1} \left\{ \sum_{n=0}^{N-1} \left( 1 - \frac{A^2 |P[f+nK] C_1[f+nK]|^2}{|P[f+nK]|^2 + \sigma_v^2} \right) \right\} E^*[f]$$

Therefore, the optimum coefficients of the feedback filter can be computed by solving following equation:

$$\sum_{f=0}^{K-1} \left\{ \sum_{n=0}^{N-1} \left( 1 - \frac{A^2 |P[f+nK] C_1[f+nK]|^2}{|P[f+nK]|^2 + \sigma_v^2} \right) \right\} E^*[f] E^T[f] b_1 = \quad (52)$$

$$\sum_{f=0}^{K-1} \left\{ \sum_{n=0}^{N-1} \left( 1 - \frac{A^2 |P[f+nK] C_1[f+nK]|^2}{|P[f+nK]|^2 + \sigma_v^2} \right) \right\} E^*[f]$$

Appendix D

Let's consider the NK-sized IDFT (inverse DFT) and downsampling with N jointly. The IDFT can be expressed as $$x[n] = \frac{1}{NK} \sum_{k=0}^{NK-1} X[k] e^{j2\pi kn/NK}, \; n = 0, 1, \cdots, NK-1 \qquad (53)$$

Then the output after downsampling with N is $$y[n] = x[nN] \qquad n = 0, 1, \cdots, NK-1 \qquad (54)$$

$$= \frac{1}{NK} \sum_{k=0}^{NK-1} X[k] e^{j2\pi knN/NK}$$

$$= \frac{1}{NK} \sum_{k=0}^{NK-1} X[k] e^{j2\pi kn/K}$$

$$= \frac{1}{K} \sum_{k=0}^{K-1} \frac{1}{N} \left( \sum_{s=0}^{N-1} X[sK+k] \right) e^{j2\pi kn/K}$$

$$= \frac{1}{K} \sum_{k=0}^{K-1} Y[k] e^{j2\pi kn/K}$$

where $$Y[k] = \frac{1}{N} \sum_{s=0}^{N-1} X[sK+k].$$

Therefore, the NK-sized DFT (IFFT) joint with N-point downsampling is equivalent to K-sized IFFT.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for use in single-carrier code division multiple access communications comprising:
    adding a plurality of prefixes to a plurality of data streams in symbol-level carrying a plurality of transmit symbols for providing a plurality of further data streams indicative of the prefix-added data streams;
    spread filtering the further data streams with a plurality of spread code signals for providing a plurality of spread data streams in a plurality of code channels; and
    combining the spread data streams into at least one code division multiple access chip-level code stream for transmission.

2. A method of code division multiple access communications wherein a plurality of data streams in symbol-level for carrying a plurality of transmit symbols are combined in a summing process into at least one chip-level code stream for transmission, said method comprising:
    adding a plurality of prefixes to the data streams in symbol-level for providing a plurality of further data streams indicative of the prefix-added data streams; and
    spread filtering the further data streams with a plurality of spread code signals for providing a plurality of spread data streams in a plurality of code channels prior to said summing, wherein each of the data streams carries one of said plurality of transmit symbols and wherein each of the data streams is divided into a plurality of data blocks so as to allow the prefixes to be added to the data blocks for providing a plurality of prefix-added data blocks.

3. The method of claim 2, wherein each of the data blocks contains $K-L_{cps}$ samples, and each of the prefixes contain $L_{cps}$ symbols, and wherein each of the prefix-added data blocks contain K samples.

4. The method of claim 3, wherein the plurality of prefix-added data blocks are combined into each of said prefix-added data streams prior to said spread filtering.

5. The method of claim 4, wherein each of said prefix-added data streams is upsampled prior to said spread filtering.

6. A method of code division multiple access communications wherein a plurality of data streams in symbol-level for carrying a plurality of transmit symbols are combined in a summing process into at least one chip-level code stream for transmission, said method comprising:
    adding a plurality of prefixes to the data streams in symbol-level for providing a plurality of further data streams indicative of the prefix-added data streams; and
    spread filtering the further data streams with a plurality of spread code signals for providing a plurality of spread data streams in a plurality of code channels prior to said summing process, wherein the transmitted chip-level code stream is received for providing a received signal indicative of the received chip-level code stream, said method further comprising:
    removing the prefixes from the received signal for providing a further signal in time domain indicative of a prefix-removed data stream; and
    converting the further signal into a transformed signal in frequency domain.

7. The method of claim 6, further comprising
    applying a plurality of feed-forward filter coefficients to the transformed signal for channel equalization in frequency domain and providing equalized signal for despreading.

8. The method of claim 7, further comprising:
    converting the despread signal into a further transformed signal in time domain.

9. The method of claim 8, further comprising
    filtering the further transformed signal with a feedback filter with previous decisions for removing inter-symbol interference in the transformed signal, the feedback filter having a plurality of filter coefficients; and
    computing the feedback filter coefficients if needed.

10. The method of claim 9, further comprising
    updating the feed-forward filter coefficients with the feedback filter through a time-to-frequency transform module in a feedback loop.

11. The method of claim 6, wherein the prefix-removed data stream is divided into a plurality of further data blocks, and each further data block contains NK samples so that said converting is carried out by a NK-sized FFT module.

12. The method of 11, further comprising
    applying a plurality of feed-forward filter coefficients to the transformed signal for channel equalization and providing a plurality of data blocks for despreading; and
    converting the despread data blocks by an NK-sized IFFT module for providing a plurality of transformed data blocks for despreading in the time domain.

13. The method of claim 12, further comprising
combining the transformed data blocks into a transformed data stream in the time domain;
downsampling the transformed data stream; and
applying a feedback filter with previous decisions to the downsampled transformed data stream for removing inter-symbol interference in the downsampled transformed data stream.

14. The method of 11, further comprising
applying a plurality of feed-forward filter coefficients to the transformed signal for channel equalization and providing a plurality of data blocks indicative of the equalized signal for downsampling;
downsampling the data blocks for despreading; and
converting the downsampled data blocks by a K-sized IFFT module for providing a plurality of transformed data stream in the time domain.

15. The method of claim 14, further comprising
applying a feedback filter with previous decisions to the transformed data stream for removing inter-symbol interference in the transformed data stream, the feedback filter having a plurality of filter coefficients; and
computing the feedback filter coefficients if needed.

16. The method of claim 15, further comprising
updating the feed-forwarding filter coefficients with the feedback filter through a time-to-frequency transform module in a feedback loop.

17. A transmitter for use in single-carrier code division multiple access communications, said transmitter comprising:
a plurality of first modules, for adding a plurality of prefixes to a plurality of data streams in symbol-level carrying a plurality of transmit symbols for providing a plurality of further data streams indicative of the prefix-added data streams;
a plurality of second modules, responsive to the further data streams, for spread filtering the prefix-added data streams by a plurality of spread code signals; and
a summing module for summing the spread data streams into at least one code division multiple access chip-level code stream for transmission.

18. The transmitter of claim 17, wherein each of the data streams carries one of said plurality of transmit symbols, said transmitter further comprising
a plurality of third modules, for dividing each of the data streams into a plurality of data blocks so as to allow the first modules to add the prefixes to the data blocks for providing a plurality of prefix-added data blocks.

19. The transmitter of claim 18, further comprising
a plurality of fourth modules for combining said plurality of prefix-added data blocks into each of said prefix-added data streams prior to said spread filtering.

20. A receiver for use in code division multiple access communications wherein a plurality of data streams in symbol-level for carrying out a plurality of transmit symbols are combined in a summing process into at least one chip-level code stream for transmission, and wherein a plurality of prefixes are added to the data streams and a plurality of spread code signals are used for spread filtering the prefix-added data streams prior to said summing process for providing the chip-level code stream, said receiver comprising
an antenna for receiving a signal indicative of the chip-level code stream;
a first module, responsive to the received signal, for removing the prefixes from the chip-level code stream for providing a prefix-removed code stream in time domain;
a second module, for converting the prefix-removed code stream into a transformed signal in frequency domain; and
a third module, for applying a plurality of feed-forward filter coefficients to the transformed signal for channel equalization in frequency domain and providing equalized signal for despreading.

21. The receiver of claim 20, further comprising
a fourth module, for converting the equalized signal into a further transformed signal in time domain.

22. The receiver of claim 21, further comprising
a fifth module for removing inter-symbol interference in the further transformed signal in time domain.

23. A network component in a single-carrier code division multiple access communications network, said network component comprising:
a transmitter comprising:
a plurality of first modules, for adding a plurality of prefixes to the data streams in symbol-level carrying a plurality of transmit symbols for providing a plurality of further data streams indicative of the prefix-added data streams,
a plurality of second modules, responsive to the further data streams, for spread filtering the prefix-added data streams by a plurality of spread code signals, and
a summing module for summing the spread data streams into at least one code divisional multiple access chip-level code stream for transmission; and
a receiver comprising:
a third module for removing the prefixes from the code division multiple access chip-level code stream for providing a prefix-removed code stream in time domain, and
a fourth module, for converting the prefix-removed code stream into a transformed signal in frequency domain.

24. The network component of claim 23, wherein the transmitter further comprises:
a plurality of fifth modules, for dividing said each of the data streams into a plurality of data blocks so as to allow the first modules to add the prefixes to the data block for providing a plurality of prefix-added data blocks; and
a plurality of sixth modules, for combining said plurality of prefix-added data blocks into each of said prefix-added data streams prior to said spread filtering.

25. The network component of claim 23, comprising a mobile terminal.

26. A network component in a code division multiple access communications network wherein a plurality of data streams in symbol-level for carrying a plurality of transmit symbols are combined in a summing process into at least one chip-level code stream for transmission, said network component comprising:
a transmitter comprising:
a plurality of first modules, for adding a plurality of prefixes to the data streams in symbol-level for providing a plurality of further data streams indicative of the prefix-added data streams, and
a plurality of second modules, responsive to the further data streams, for spread filtering the prefix-added data streams by a plurality of spread code signals prior to said summing process; and a receiver comprising:
  a third module for removing the prefixes from the chip-level code stream for providing a prefix-removed code stream in time domain, and
  a fourth module, for converting the prefix-removed code stream into a transformed signal in frequency domain, wherein the transmitter further comprises:
  a plurality of fifth modules, for dividing said each of the data streams into a plurality of data blocks so as to allow the first modules to add the prefixes to the data block for providing a plurality of prefix-added data blocks; and a plurality of sixth modules, for combining said plurality of prefix-added data blocks into each of said prefix-added data streams prior to said spread filtering, and the receiver further comprises:

a seventh module, for applying a plurality of feed-forward filter coefficients to the transformed signal for channel equalization in frequency domain and providing equalized signal for despreading;

an eighth module, for converting the equalized signal into a further transformed signal in time domain; and a ninth module for removing inter-symbol interference in the further transformed signal in time domain.

* * * * *